(12) United States Patent
Kampe et al.

(10) Patent No.: US 7,143,167 B2
(45) Date of Patent: Nov. 28, 2006

(54) METHOD AND SYSTEM FOR MANAGING HIGH-AVAILABILITY-AWARE COMPONENTS IN A NETWORKED COMPUTER SYSTEM

(75) Inventors: Mark A. Kampe, Los Angeles, CA (US); Frederic Herrmann, Palo Alto, CA (US); Gia-Khanh Nguyen, San Jose, CA (US); Eltefaat H. Shokri, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 857 days.

(21) Appl. No.: 09/846,380

(22) Filed: May 2, 2001

(65) Prior Publication Data

US 2001/0054095 A1    Dec. 20, 2001

Related U.S. Application Data

(60) Provisional application No. 60/201,098, filed on May 2, 2000, provisional application No. 60/201,099, filed on May 2, 2000, provisional application No. 60/201,106, filed on May 2, 2000.

(51) Int. Cl.
*G06F 15/173* (2006.01)
*G06F 15/16* (2006.01)

(52) U.S. Cl. ............... 709/226; 709/217; 709/219; 709/223

(58) Field of Classification Search ............. 709/201, 709/208–209, 211, 220–224, 217–219, 223–226
See application file for complete search history.

(56) References Cited

U.S. PATENT DOCUMENTS 5,740,348 A    4/1998  Cunliffe et al. ........ 395/182.04
5,805,785 A    9/1998  Dias et al.
6,145,094 A   11/2000  Shirriff et al. ............... 714/11

(Continued)

FOREIGN PATENT DOCUMENTS

EP    0 936 547 A2    8/1999

(Continued)

OTHER PUBLICATIONS

H.V. Jagadish et al., "Dalí: A High Performance Main Memory Storage Manager," Proceedings of the 20th VLDB Conference Santiago, Chile 1994, pp. 1-12.

(Continued)

*Primary Examiner*—Ario Etienne
*Assistant Examiner*—Hussein El-chanti
(74) *Attorney, Agent, or Firm*—Kent A. Lembke; William J. Kubida; Hogan & Hartson LLP

(57) ABSTRACT

The present invention describes a method and system for managing high-availability-aware components in a networked computer system. In particular, the method includes registering components and dynamically allocating roles and assignments to one or more of the registered components to achieve a desired level of redundancy based on component type information. The method may include an additional step of performing administrative actions on the registered components in response to a request from an external management agent in order to increase the availability of services provided by the high-availability-aware components. Further, the method may additionally include responding to an error by changing roles and assignments of one or more of the registered components, providing information to registered components so that related components may communicate to achieve a desired redundancy level, and/or maintaining additional information relevant to managing high-availability-aware components. Such additional information may include information regarding software release domains, component relationships, and/or protection groups.

14 Claims, 11 Drawing Sheets

U.S. PATENT DOCUMENTS

| | | | |
|---|---|---|---|
| 6,163,856 A | 12/2000 | Dion et al. ..................... 714/4 |
| 6,212,559 B1 * | 4/2001 | Bixler et al. ................. 709/221 |
| 6,324,580 B1 * | 11/2001 | Jindal et al. ................ 709/228 |
| 6,496,948 B1 * | 12/2002 | Smorodinsky ............... 714/37 |
| 6,549,538 B1 * | 4/2003 | Beck et al. ............ 370/395.52 |
| 6,571,283 B1 * | 5/2003 | Smorodinsky .............. 709/220 |
| 6,633,538 B1 * | 10/2003 | Tanaka et al. .............. 370/222 |
| 6,654,752 B1 * | 11/2003 | Ofek ........................... 707/10 |
| 6,766,348 B1 * | 7/2004 | Combs et al. .............. 718/104 |

FOREIGN PATENT DOCUMENTS

| | | |
|---|---|---|
| EP | 0 953 911 A2 | 11/1999 |
| EP | 0 990 986 A2 | 4/2000 |
| EP | 1 134 658 A2 | 9/2001 |
| WO | WO 98/34366 | 8/1998 |

OTHER PUBLICATIONS

P. Bohannon et al., "The Architecture of the Dalí Main Memory Storage Manager," Multimedia Tools and Applications, vol. 4, No. 2, pp. 115-151 (reprinted as pp. 1-36), Mar. 1997.

* cited by examiner

METHOD AND SYSTEM FOR MANAGING HIGH-AVAILABILITY-AWARE COMPONENTS IN A NETWORKED COMPUTER SYSTEM

CROSS REFERENCE TO RELATED APPLICATIONS

This application claims the benefit of U.S. Provisional Application Nos. 60/201,098, 60/201,099, and 60/201,106, which were all filed on May 2, 2000, and which are hereby incorporated by reference.

BACKGROUND OF THE INVENTION

1. Field of the Invention

The present invention relates to a method and system for managing components in a networked computer system. In particular, the present invention relates to a method and system that dynamically allocates assignments and roles to components to maintain the availability of services provided by the components.

2. Discussion of the Related Art

Networked computer systems enable users to share resources and services. One computer can request and use resources or services provided by another computer. The computer requesting and using the resources or services provided by another computer is typically known as a client, and the computer providing resources or services to another computer is known as a server.

A group of independent network servers may be used to form a cluster. Servers in a cluster are organized so that they operate and appear to clients, as if they were a single unit. A cluster and its network may be designed to improve network capacity, by among other things, enabling the servers within a cluster to shift work in order to balance the load. By enabling one server to take over for another, a cluster may be used to enhance reliability and minimize downtime caused by an application or system failure.

Today, networked computer systems are used in many different aspects of our daily lives. They are used, for example, in business, government, education, entertainment, and communication. As the use of networked computer systems becomes more prevalent and our reliance on them increases, it has become increasingly more important to achieve the goal of always-on computer networks, or "high-availability" systems.

High-availability systems need to detect and recover from a failure in a way transparent to its users. For example, if a server in a high-availability system fails, the system must detect and recover from the failure with no or little impact on clients.

Various methods have been devised to achieve high availability in networked computer systems. For example, one method known as triple module redundancy, or "TMR," is used to increase fault tolerance at the hardware level. Specifically, with TMR, three instances of the same hardware module concurrently execute and by comparing the results of the three hardware modules and using the majority results, one can detect the failure of the hardware modules. However, TMR does not detect and recover from the failure of software modules. Another method for achieving high availability is software replication, in which a software module that provides a service to a client is replicated on at least two different nodes in the system. While software replication overcomes some disadvantages of TMR, it suffers from its own problems, including the need for complex software protocols to ensure that all of the replicas have the same state.

The use of replication of hardware or software modules to achieve high-availability raises a number of new problems including management of replicated hardware and software modules. The management of replicas has become increasingly difficult and complex, especially if replication is done at individual software and hardware levels. Further, replication places a significant burden on system resources. Thus, there is a need for a system and method to efficiently manage replicas of software and hardware modules to achieve high availability.

SUMMARY OF THE INVENTION

The present invention provides a system and method for managing high-availability-aware ("HA-aware") components in a networked computer system. In particular, the present invention, by cooperating with HA-aware components, effectively manages such components and their relationships in a wide range of networked computer systems to achieve high availability.

To achieve these and other advantages and in accordance with the purposes of the present invention, as embodied and broadly described herein, a method for managing HA-aware components in a networked computer system includes registering the HA-aware components to be managed. The method also includes dynamically allocating roles and assignments to one or more of the registered components of the HA-aware components to achieve a desired redundancy level based on component type information.

In another aspect, the invention includes a method for allocating an assignment in a networked computer system. The method includes registering components. The components are high-availability aware. The method also includes allocating roles to registered components among the components, allocating the assignment to a first component selected from the registered components based on component type information of the first component, and changing a role of the first component to primary. The method further includes determining a redundancy level based on the component type information, allocating the assignment to a predetermined number of secondary components selected from the registered components based on component type information of the secondary components. The predetermined number is based on the redundancy level. In addition, the method includes changing roles of the predetermined number of secondary components to secondary and notifying the first component about the predetermined number of secondary components and the predetermined number of secondary components about the first component.

In yet another aspect, the invention includes a method of allocating an assignment HA-aware components in a networked computer system. The method includes registering the HA-aware components, allocating roles to registered components of the HA-aware components, and maintaining component relationship information. The method also includes selecting a first component from the registered components based on component type information and the component relationship information, allocating the assignment to the first component, and changing a role of the first component to primary. It further includes determining a redundancy level based on the component type information, selecting a predetermined number of secondary components from the registered components based on component type information of the secondary components and the component relationship information. The predetermined number is based on the redundancy level. Finally, the method includes changing roles of the predetermined number of secondary components to secondary and notifying the first component about the predetermined number of secondary components and the predetermined number of secondary components about the first component.

In further aspect, the invention includes a computer program product for managing high-availability-aware components in a networked computer system. Such computer program product includes computer readable program codes configured to: (1) register the high-availability-aware components to be managed and (2) dynamically allocate roles and assignments to one or more of the registered components among the high-availability-aware components to achieve a desired redundancy level based on component type information. It also includes a computer readable medium having the computer readable program codes embodied therein.

In another aspect, the invention includes a computer readable medium configured to embody computer programming instructions for managing high-availability-aware components in a networked computer system. The computer programming instructions include registering the high-availability-aware components to be managed and dynamically allocating roles and assignments to one or more of the registered components of the high-availability-aware components to achieve a desired redundancy level based on component type information.

In yet another aspect, the invention includes a computer program product for allocating an assignment in a networked computer system. The computer program product includes computer readable codes configured to: (1) register high-availability-aware components; (2) allocate roles to registered components of the high-availability aware components; (3) allocate the assignment to a first component selected from the registered components based on component type information of the first component; and (4) change a role of the first component to primary. It also includes computer readable codes configured to determine a redundancy level based on the component type information, and allocate the assignment to a predetermined number of secondary components selected from the registered components based on component type information of the secondary components. The predetermined number is based on the redundancy level. In addition, it includes computer readable program codes configured to change roles of the predetermined number of secondary components to secondary and notify the first component about the predetermined number of secondary components and the predetermined number of secondary components about the first component. Finally, it includes a computer readable medium having the computer readable program codes embodied therein.

Further, the invention includes a system for managing high-availability-aware components in a networked computer system. The system includes means for registering the high-availability aware components to be managed and means for dynamically allocating roles and assignments to one or more of registered components of the high-availability-aware components to achieve a desired redundancy level based on component type information.

In yet further aspect, the invention includes a system for allocating an assignment in a networked computer system. The system includes means for registering high-availability-aware components, means for allocating roles to registered components of the high-availability-aware components, means for allocating the assignment to a first component selected from the registered components based on component type information of the first component, and means for changing a role of the first component to primary. The system further includes means for determining a redundancy level based on the component type information, means for allocating the assignment to a predetermined number of secondary components selected from the registered components based on component type information of the secondary components. The predetermined number is based on the redundancy level. The system also includes means for changing roles of the predetermined number of secondary components to secondary and means for notifying the first component about the predetermined number of secondary components and the predetermined number of secondary components about the first component.

Finally, the invention also includes a mechanism configured to manage a high-availability-aware components in a networked computer system. Such mechanism includes mechanisms configured to: (1) register the high-availability aware components to be managed and (2) dynamically allocate roles and assignments to one or more of registered components of the high-availability-aware components to achieve a desired redundancy level based on component type information.

Additional features and advantages of the invention are set forth in the description which follows, and in part are apparent from the description, or may be learned by practice of the invention. The objectives and other advantages of the invention are realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference is now made in detail to the preferred embodiment of the present invention, examples of which are illustrated in the accompanying drawings.

Figure 1:
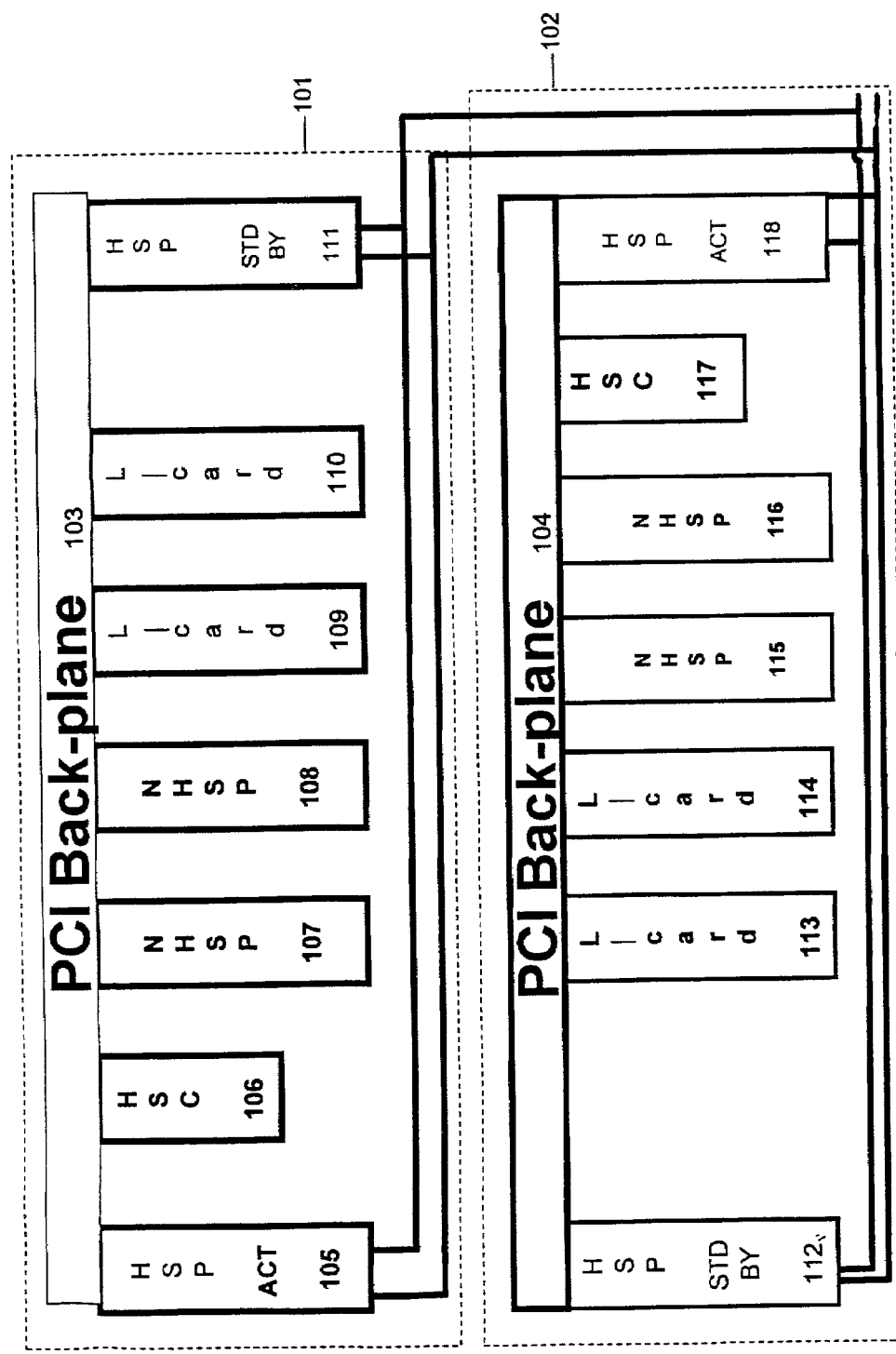
FIG. 1 is a simplified representational drawing of a networked computer system that may serve as an operating environment for the present invention.

FIG. 1 is a simplified representational drawing of a networked computer system in which the present invention may be used. It is important to note that the system shown in FIG. 1 is merely an example and that the present invention may be utilized in much larger or smaller systems. In other words, the present invention does not depend on the architecture of an underlying networked computer system.

The system of FIG. 1 has two independent shelves 101 and 102, which are interconnected by a network. Each shelf may include: (1) one compact PCI back-plane (103 and 104); (2) redundant power supplies and fans; (3) one dual-ported, hot-swap controller ("HSC") (106 and 117), which manages the power to the slots, as well as the power supplies, fans, and environment alarms; (4) a bus-switch, permitting the bus to be managed by one of two host-slot processors; (5) two hot-swap-able host-slot processors ("HSPs"), one active (105 and 118) and one standby (111 and 112); (6) two line cards ("L-cards"), which are hot-swap-able (109, 110, 113, and 114); and (7) two non-host-slot processors ("NHSPs") (107, 108, 115, and 116).

Nodes within a single shelf would communicate across the compact PCI ("cPCI") back-plane. Communication between nodes on different shelves may use a network, which, for example, can be dual-redundant 100 Mhz ethernets. The HSP nodes would act as gateways, relaying packets between their cPCI back-planes and the ethernets. Further, L-cards may be made 2N-redundant, for example, by making the L-cards 109 and 114 standbys for the L-cards 113 and 110, respectively. NHSPs may be made N+1 redundant, for example, by making the NHSP 116 act as a standby for the other three NHSPs 107, 108, and 115.

Figure 2:
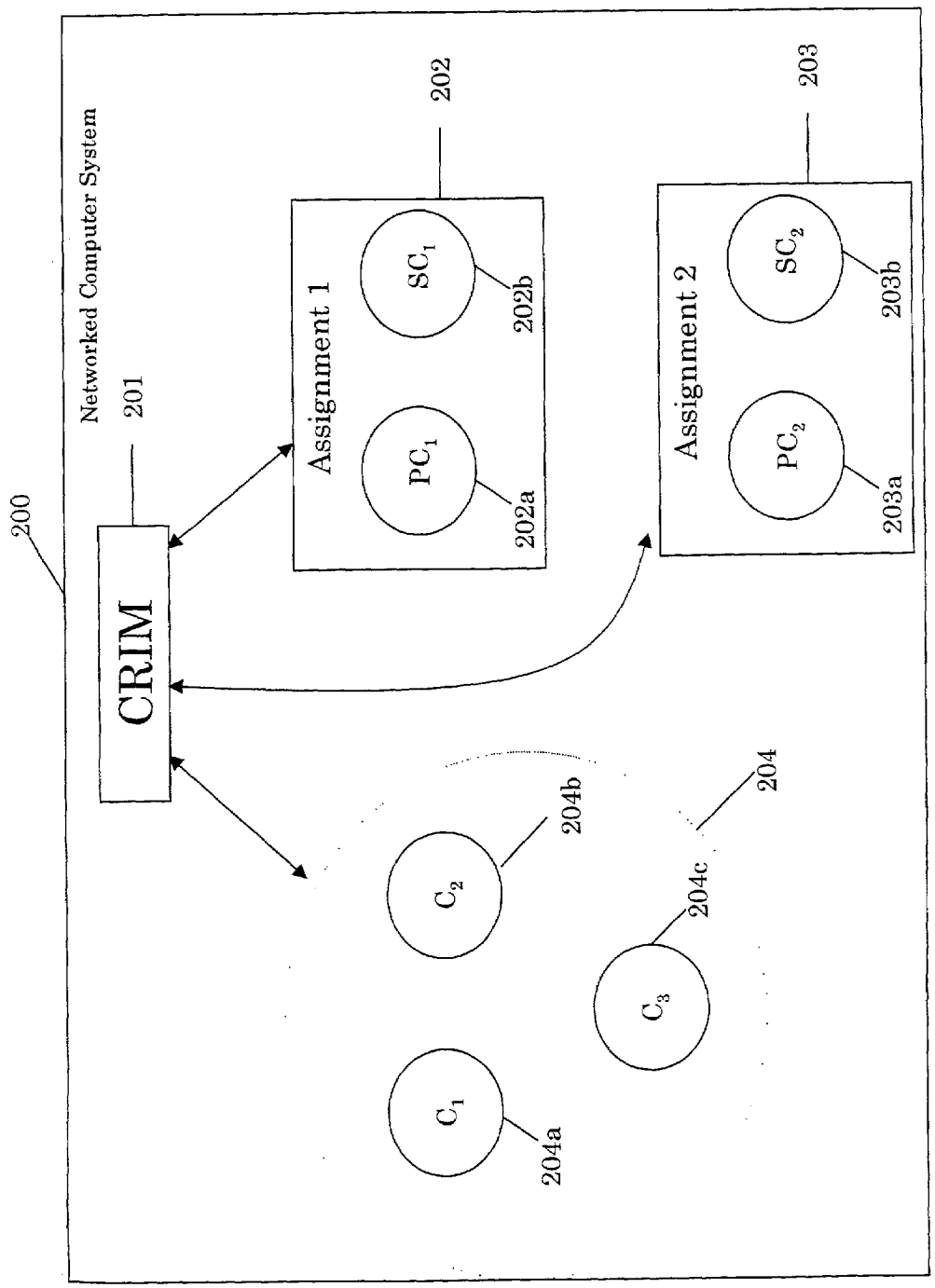
FIG. 2 is a block diagram of a logical view of one operational aspect of a component role and assignment management system of the present invention.

FIG. 2 is a block diagram showing a logical view of a component role and assignment management system ("CRIM") 201 of the present invention. Typically, a CRIM is used within a networked computer system to help the system achieve high availability by managing components of the system. The CRIM may be replicated—for example, a primary CRIM may run on a master node of the networked computer system or cluster and a secondary CRIM on a backup node.

A component is an encapsulation of a logical aggregation of functions provided by software, hardware, or both that is designated to behave as a unit of deployment, redundancy, and manageability within a networked computer system. A component may have various states ("component states"). It may be uniquely identified by its type ("component type"), representing the functional semantic of the component. A component type may be instantiated into one or multiple component instances. A component instance, which may be referred to as a component for simplicity, acts as the unit of manageability of the CRIM.

Components are HA-aware, if they are aware of their execution in a highly available environment. In other words, they are capable of cooperating and complying with the highly available environment. They may also facilitate the environment to achieve high availability more efficiently and effectively. Further this cooperation between the components and the environment may increase the flexibility and scalability of the environment to deal with the components and their relationships in more realistic settings of distributed applications.

The various aspects of components, including (1) component states, (2) component assignment, (3) component role, (4) component types, and (5) component categories are now discussed.

(1) Component States: Various state types may be associated with components—they include availability state, administrative state, operational state, usage state, and presence state. It is not necessary for all of the five state types to be supported to implement the present invention.

For each state type, there are several possible values. As to the availability state type, its values may include primary, quiescing, secondary, spare, and off-line. The availability state type and its values are explained below in more detail when discussing FIG. 4. The values of the availability state type reflect roles assigned by the CRIM to components within a networked computer system. The CRIM is responsible for changing the role of each component and for implementing and recording it. The operational state type may be used to represent that an object is usable. This state results from the state of a component and the state of one of its parents in containment and/or dependency relationships. This state type is explained further when discussing relationships.

The administrative state type describes the condition of an object from a manager's perspective. Its state values may include, locked, unlocked, and shutting-down. The CRIM may be used to implement and record this state. Preferably, this state is persistent and recorded in Lightweight Direct Access Protocol ("LDAP") in order to be preserved through a board, shelf, or network element reset.

The usage state type may be used to define whether or not a component is actively in use at a specific instant, and if so, whether or not it has spare capacity for additional uses at that instant. If it has spare capacity, it is active; if not, it is busy. This state, if used, is typically owned and maintained by a component itself.

Finally, the presence state type may be used to give information about the physical presence of hardware or software associated to a component. Its values may include present and missing. Like the administrative state type, this state may preferably be in LDAP so that it can be preserved through a board, shelf, or network element reset.

(2) Component Assignments: Each component type is typically assumed to be capable of providing a generic functionality. This generic functionality is instantiated with further specialization. For example, a component type C-T1 may be capable of providing a radio-channel control function. However, the radio-channel control function can be applied to three different frequency ranges, for example Freq1, Freq2, and Freq3. A component C1 of type C-T1 can be assigned to provide one specific frequency, such as Freq1. This specialized functionality is called component assignment.

The CRIM is responsible for giving assignments to registered components. A component type is usually designed to provide one or multiple assignments. A component instance may be given at most one assignment with a primary role at any given time. A component instance may be given one or more assignments with a secondary role. Spare and off-line components are not given any assignment.

A protection group may be implemented as a specialization of the component assignment for hardware components. According to network management standards, a protection group is a set of hardware components that together provide a highly available service. Members of a protection group facilitate fail-over, load balancing, or both. Members of a protection group are determined in the system configuration. In other words, to add or remove a member from a protection group, the configuration needs to be modified. Based on the above semantics of the protection group construct, a protection group can be implemented as a specialization of the component assignment for hardware components.

Figure 4:
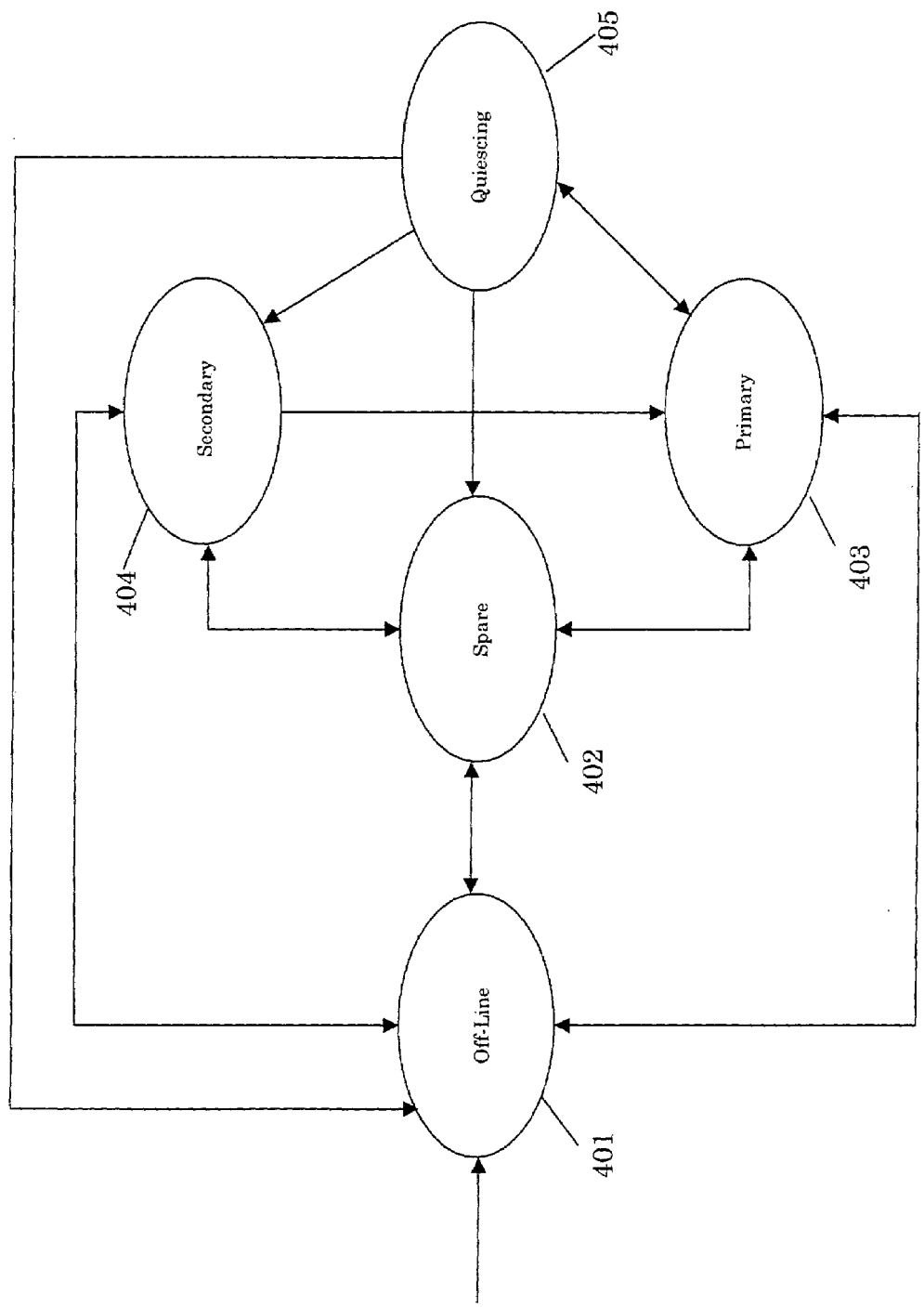
FIG. 4 is a block diagram showing relationships among five component roles.

(3) Component Roles: Turning to FIG. 4, there are five possible roles for components—they are primary (403), secondary (404), spare (402), quiescing (405), and off-line (401). As discussed earlier, roles correspond to values of the availability state of a component. The CRIM is responsible for implementing the availability state of a component. Thus, the CRIM assigns, updates, and records an availability state value (or role) to a component.

The CRIM may issue one of the following five role assignment requests to a component: go-off-line, go-spare, go-secondary, go-quiescing, and go-primary. These role assignment requests change the availability state of the component that receives it to off-line, spare, secondary, quiescing, and primary, respectively.

A component is in the off-line state 401, if it can run diagnostics or respond to external management commands but is not available to perform services. A component may be initially given the off-line state 401 by default after registering with the CRIM. The CRIM may immediately instruct the component to go into the spare state 402. Alternatively, the CRIM may instruct the component to go directly into the primary 403 or secondary 402 state. For example, during a restart cycle, the CRIM may request the component to go directly to the state it had before the restart (i.e., the primary 403 or secondary 404 state) from the off-line state 401 to make the restart cycle faster. As indicated by arrows in FIG. 4, a component in the spare (402), primary (403), secondary (404), or quiescing (405) state can be instructed to return to the off-line state 401.

The CRIM may place a component in the off-line state 401 for various reasons. As discussed above, the off-line state 401 may serve as a default state for registered components. The CRIM may place a component in the locked administrative state to the off-line state 401 until it is asked to unlock the component. When the component is unlocked, it may be placed in the spare state 402. The CRIM may also place a component whose operational state becomes disabled to the off-line state 401. In this case, the component may stay in the off-line state 401, until the CRIM is asked to enable the component. If a component is in the disabled state at the time of registration with the CRIM, the CRIM may keep the component in the off-line state 401 (instead of moving it to the spare state 402, for example), until the component is enabled.

A component is in the spare state 402, if it is not currently performing any services but is available to do so at any time. A component in the primary state 403 is active and provides a service. It may also prepare checkpoints (for example, by saving checkpoints, if a replicated checkpoint service is used) to be used by its secondary component. A component in the secondary state 404 may not actually be providing services, but is acting as a standby for its associated primary component. A secondary component is typically prepared to assume the primary role at any time.

Finally, a component is in the quiescing state 405, if it is still a primary provider of some functionality but serves only those client requests that have been submitted before receiving a go-quiescing command from the CRIM. While in this state, the component may queue new client requests and process pending ones. A component can go to the quiescing state 405 only from the primary state 403. While in the quiescing state 405, a component has information and capability to resume its primary state 403 if it is ordered to do so by the CRIM. A component in the quiescing state 405 is ready to resume its primary state 403 because it has an updated checkpoint as well as unprocessed client requests. The CRIM may ask the quiescing component to go to the primary (403), secondary (402), spare (402), or off-line (401) state.

For a component to be functional, a component may need both an assignment and a role.

It is important to note that the above descriptions of component roles are based on one embodiment of component roles of the present invention. As such, they are given as examples and other implementations of component roles would be known to those skilled in the art and are within the scope of the invention.

(4) Component Type: As stated above, each component may be uniquely identified by its type, representing the functional semantic of a component. The functionality offered by a component type may require a specific degree of high availability. To achieve the required high availability for a component type, all components of that type may need to be executed in a redundant manner. In other words, a redundancy model may need to be assigned to each component type. The CRIM may have a responsibility of guaranteeing that all assignments of a component type are available according to a specified redundancy model, if possible.

For any supported redundancy models, the CRIM may apply the following assignment rules: (1) at most one primary component for an assignment; (2) at most one secondary component for an assignment; and (3) any number of spare components for the assignments supported by a component type.

In addition to functional attributes (such as program object files, etc.), a component type may have the following component type level attributes shown in Table 1 below.

TABLE 1

| Attribute | Sub-attribute | Description |
| --- | --- | --- |
| Recovery parameter | Restart attribute | Indicates if restart is an appropriate recovery action |
| | Fail-over attribute | Indicates when to do fail-over, and how it affects the rest of the node |
| | Redundancy model | Preferred redundancy model of the component type (for example, 2N, or N + 1) |

In addition, there may be at least two additional types of attributes that are related to component types—component instance level attributes and component assignment level attributes. Component instance level attributes are those attributes specific to each component instance, such as input parameters, and environment. Component assignment level attributes include those attributes of a component type that can vary for different assignments of the component type. For example, component assignment level attributes may specify where and how various assignments of a component type should run or hardware units on which the components of different assignments can run. Table 2 shows several component assignment level attributes that may be used.

TABLE 2

| Attribute | Description |
| --- | --- |
| Component type | Identifies the component type to which the assignment belongs |
| Assignment name | Distinguishes the assignment from other assignments of the same component type |
| Assignment Priority | Used for prioritizing assignments of a component type |
| Node group | A node group includes all nodes that are dedicated to run a specific assignment of a component type |

It is important to note that the component attributes discussed above are merely an example of what and how the information may be structured to represent the concepts of component type and assignment. As such, the present invention is not limited to specific component attributes discussed above and includes other attributes and methods of representing the concepts of component type and assignment that are known to those skilled in the art.

Figure 3:
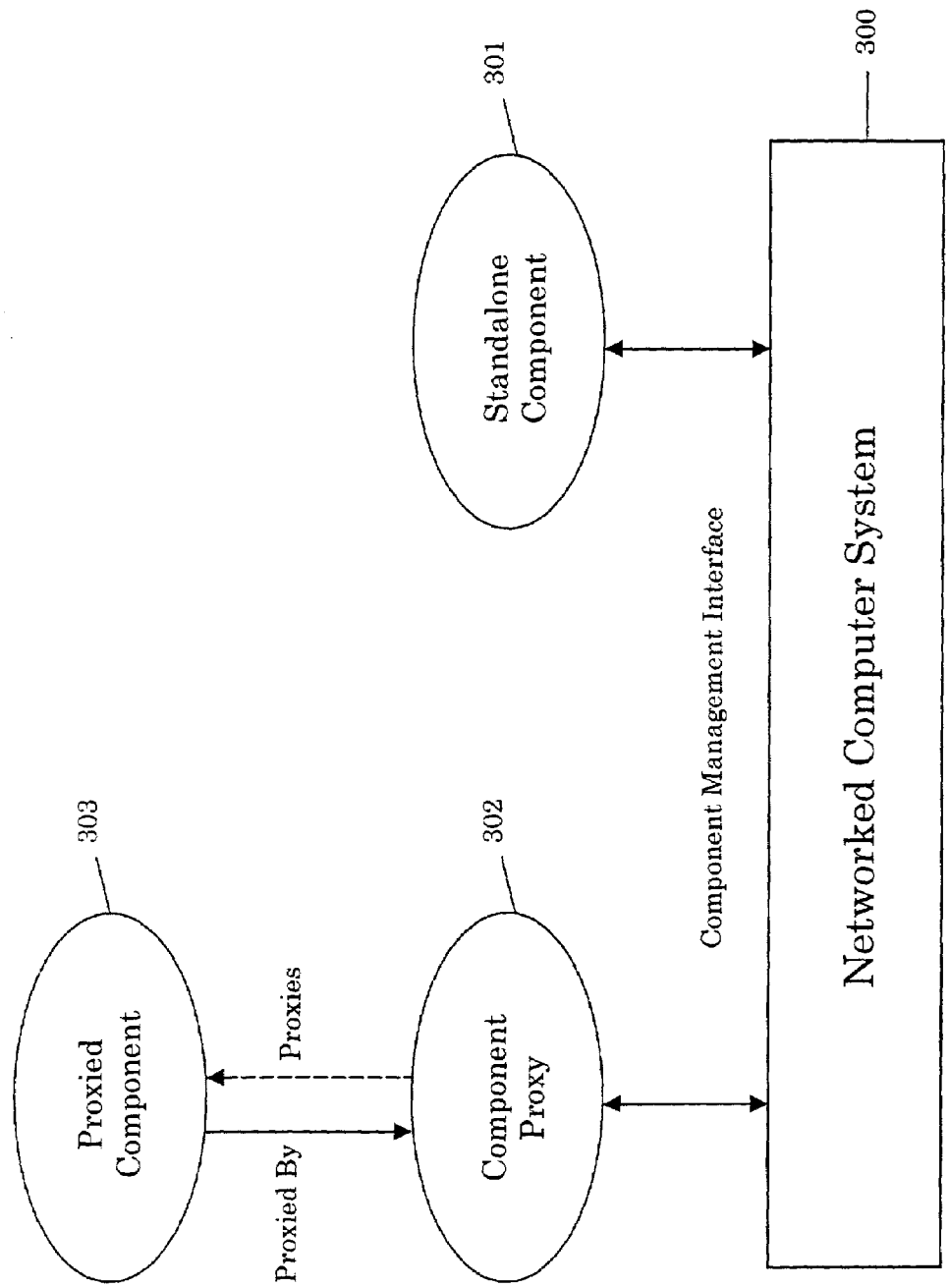
FIG. 3 is a block diagram illustrating logical relationships among component categories.

(5) Component Categories: As shown in FIG. 3, components of the present invention may be classified into the three categories. A standalone component 301 runs on a peer node of a networked computer system 300. A component is a standalone component, if it provides a component management interface of its own. For example, call-processing applications are typically standalone components.

A proxied component 303 is not directly managed by the networked computer system 300. In general, proxied components do not provide management interfaces of their own. Examples of proxied components may include transceiver payload cards, shelves, and software running on a payload card.

In general, a proxied component is associated with one or more proxy components. In FIG. 3, the proxied component 303 is associated with a proxy component 302. The proxy component 302 acts as a management interface between the networked computer system 300 and the proxied component 303. While a proxied component may be managed (or made accessible) by a number of redundant proxy components at any given time, typically one active proxy component is assigned to a proxied component. A proxy component may serve one or multiple proxied components.

Having explained components in detail, examples are used to describe operations performed by the CRIM to allocate roles and assignments to components.

Turning back to FIG. 2, the CRIM 201 may allocate an assignment to a spare component. FIG. 2 shows a set of spare components 204 with three spare components $C_1$, $C_2$, and $C_3$, or 204a, 204b, and 204c, respectively. In FIG. 2, two assignments 202 and 203 are allocated using four components—Assignment 1 is given to $PC_1$ 202a and $SC_1$ 202b and Assignment 2 is given to $PC_2$ 203a and $SC_2$ 203b. For each assignment, there is one component playing a primary role ($PC_1$ 202a and $PC_2$ 203a) and one component playing a secondary role ($SC_1$ 202b and $SC_2$ 203b). The primary components, $PC_1$ 202a and $PC_2$ 203a, are active and actually provide a service. The secondary components, $SC_1$ 202b and $SC_2$ 203b, on the other hand, act as a standby for the primary components, $PC_1$ 202a and $PC_2$ 203a, respectively. Secondary components, in general, are prepared so that they may assume a primary role at any time. To enable secondary components to assume a primary role, primary components may prepare checkpoints, which are made available to corresponding secondary components.

While FIG. 2 shows only two components per assignment, one may assign any number of components to each assignment. For example, there may be one primary component and three secondary components for an assignment. In other words, appropriate numbers of primary and secondary components may depend on a desired level of redundancy, such as hot-restart, 2N, and N+1, for example. Different redundancy models may be used for different components. Further, decisions to bring individual components in and out of service may be based on various factors, including conditions within a network element or commands received from an external source such as a network management center.

It is understood that an assignment is available when a component is made primary for that assignment. For redundancy reasons, another component may be given a secondary role for the same assignment. Because a secondary role is generally not very resource intensive, it is possible that a component, while being a secondary for an assignment, can also be a secondary for some other assignments of the same component type. Then, when the secondary component becomes primary for an assignment, it could be relieved of the secondary roles for the other assignments.

Figure 7:
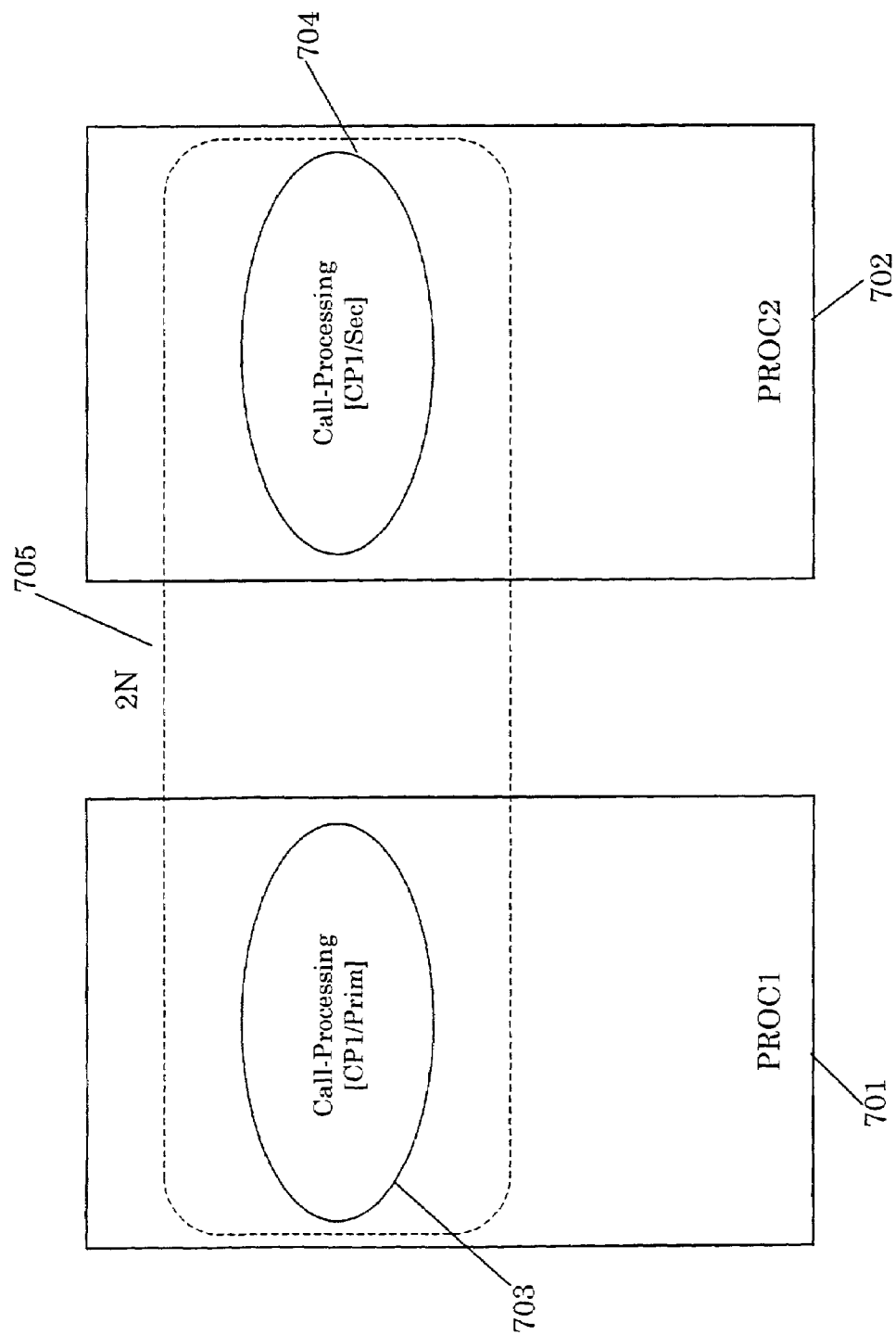
FIG. 7 is a block diagram showing a logical view of one use of the present invention for call-processing applications running on peer nodes with 2N redundancy.
Figure 8:
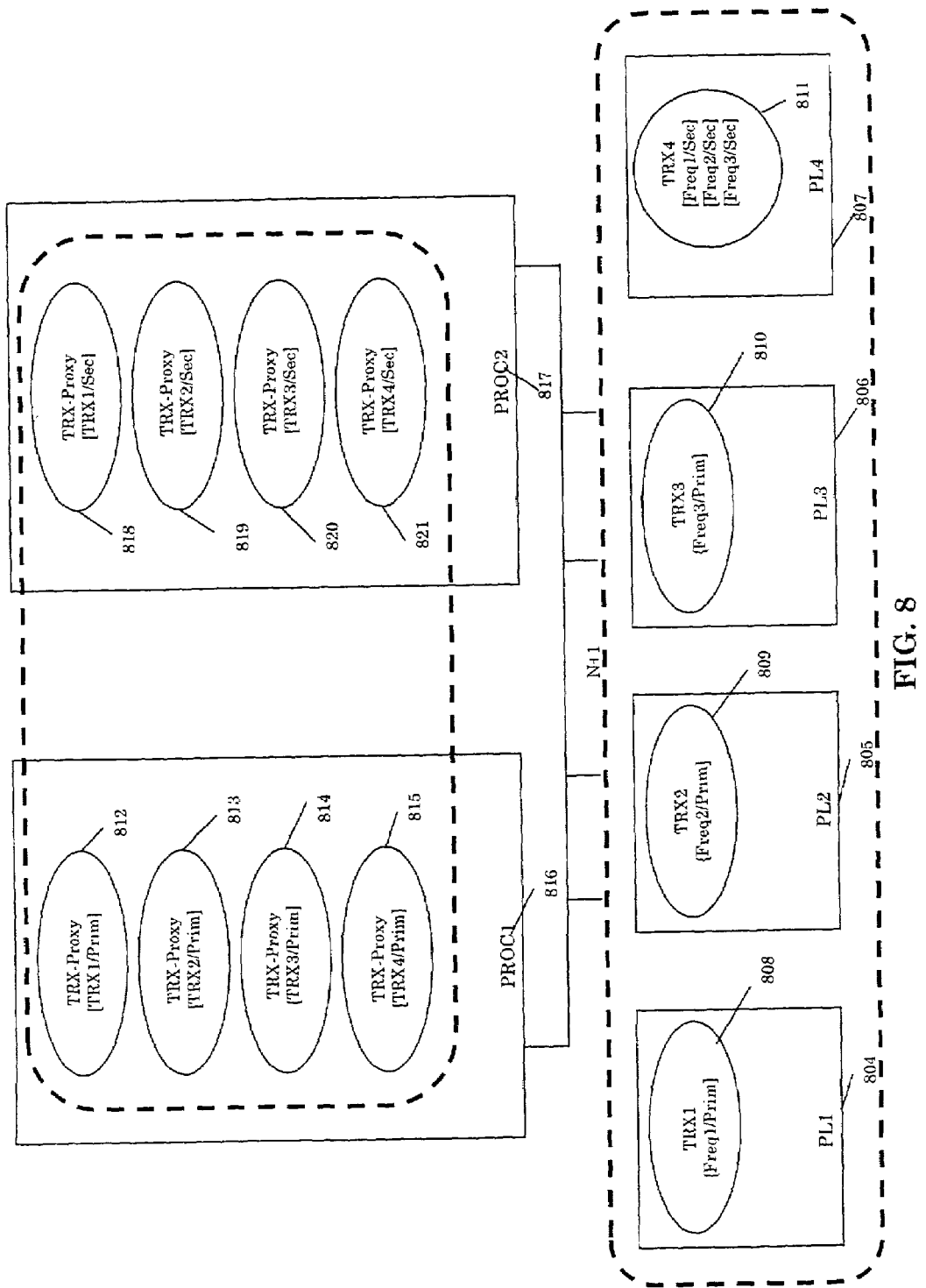
FIG. 8 is a block diagram illustrating another use of the present invention with radio channel control applications.
Figure 9:
FIG. 9 is a block diagram showing yet another use of the present invention in a container management setting.

FIGS. 7, 8, and 9 are block-diagrams showing examples that illustrate component assignments for various types of components. FIG. 7 is a block diagram showing component types and assignments for a call-processing application running on peer nodes with 2N redundancy 705. Specifically, PROC1 701 and PROC2 702 are peer nodes used by an availability management framework to provide a highly available call processing application CP1 using the 2N redundancy model. A component 703 has an assignment of the call processing component type CP1 and a role of primary. A component 704 has an assignment of CP1 and a role of secondary. Recovery parameters may include restart attributes with restart_recovery_OK and fail-over attributes with node fail-over.

FIG. 8 illustrates a scenario where a radio channel control application uses four transceivers, TRX1, TRX2, TRX3, and TRX4, to cover three frequency channels Freq1, Freq2, and Freq3 with N+1 redundancy. In this example, three assignments of the transceiver component type ("TRX") as denoted in components 808, 809, and 810 are made. For example, the component 808 of the component type TRX is given an assignment Freq1 with a primary role. The components 808, 809, 810, and 811 belong to a node group PL1, PL2, PL3, and PL4, or 804, 805, 806, and 807, respectively.

Further, proxy components of a specific component type are created to manage the component of type TRX. Specifically, there are four assignments of a TRX_Proxy component type—namely TRX1, TRX2, TRX3, and TRX4. They correspond to components 812, 813, 814, and 815, having a component type name of TRX-Proxy and a primary role. The components 812, 813, 814, and 815 have assignments of TRX1, TRX2, TRX3, and TRX4 respectively. To protect the proxy service from peer node failures, components associated to these four assignments are created in a PROC1 816 and a PROC2 817. In other words, components 818, 819, 820, and 821 are assigned secondary roles for assignments TRX1, TRX2, TRX3, and TRX4, respectively.

If the radio channel control on the TRX1 808 fails, the TRX4 811 takes over the channel Freq1, and provides services through the TRX4-Proxy 815. On the other hand, if the PROC1 816 fails over to the PROC2 817, the proxies TRX1-Proxy 818, TRX2-Proxy 819, TRX3-Proxy 820, and TRX4-Proxy 821 running in the PROC2 817 take over the service interface and the management for the TRX1 808, TRX2 809, TRX3 810, and TRX4 811, with no role changes among the TRX components.

FIG. 9 is a block diagram illustrating an example in which a proxy manages a container, such as a shelf. Here, a component 903 running on a PROC1 901 has a component type name of Shelf_Proxy with assignment SH1_Pr. The component 903 plays a primary role. A component 904 in a PROC 2 902 has the same component type and assignment as the component 903, but plays a secondary role. The shelf-proxy service in FIG. 9 has 2N redundancy.

Next, functionalities involved in the interaction between individual components and the CRIM are discussed.

Initially, components may register with a CRIM. The registration of a component with the CRIM may allow the CRIM to manage the availability of the component and execute administrative and operational commands, such as commands issued by an external management agent. It is preferable that all components register with the CRIM for availability management, regardless of whether they are high-availability managed or not.

Once registered, components may query the CRIM to obtain information maintained by the CRIM. This includes availability management, administrative states, and operational states. The CRIM may also provide information about components representing a given assignment.

Components can also inform the CRIM of its own predetermined role, if any. Some components may be allowed to claim their own initial role to reduce an interruption of component functions due to interactions with the CRIM. These components are called self-determining components. Self-determining components may directly assume a primary role for a particular assignment after being started and then report that fact to the CRIM.

An example of a self-determining component may include a node component on each of two System Controllers ("SCs") of a single cPCI shelf. Once started these components may arbitrate among them so that one of the SCs assumes the control of the cPCI bus to allow the rest of the shelf to be powered on. The node component on this SC may want to inform the CRIM that it has assumed control so that appropriate assignments are made. If the CRIM decides to perform a node fail-over recovery, it instructs the SC with a primary role to yield the cPCI bus control and the other SC to take over the primary role.

The CRIM may issue various commands to components. These commands may include changes in assignments and changes in one of the states managed by the CRIM including availability management, administrative states, and operational states. Components may inform the CRIM of a result of a command execution.

The CRIM may notify components of assignment status changes. This keeps a component informed of a status of relevant assignments, including an assignment in which it participates and assignments on which it depends.

It is not necessary for a component to report its failure status directly to the CRIM. In other words, the CRIM may find out about errors indirectly from other sources.

When a registered component wants to be dismissed from an availability management service, it may request the CRIM to unregister it. For example, a component may want to be dismissed from an availability management service so that it can terminate gracefully. However, there are situations in which components cannot execute the unregistration process. For example, a component may be terminated unexpectedly due to a fatal error condition. In these situations, the CRIM may detect termination by other means. For example, it might receive a termination notice from other sources. Upon receiving a termination report for a previously registered component, the CRIM may perform an implicit unregistration for the component.

Overall, the interface between a component and the CRIM may include both invocations from the component to the CRIM, and invocations from the CRIM to the component. The CRIM may export functions that the component may call to invoke its services. The component may be held responsible for exporting function calls expected by interfaces using, for example, a registration process, so that the CRIM can interact with the component. Preferably, requests from the CRIM to the component are asynchronous operations because the component takes a command from one of the callbacks, but may indicate the completion of the command by a specific invocation to the CRIM.

Table 3 contains various interfaces that the CRIM may have for communicating with components.

TABLE 3

| Interface | Type | Caller | Called by | Description |
| --- | --- | --- | --- | --- |
| crim_register | API | Component | CRIM | Registration with the CRIM |
| crim_unregister | API | Component | CRIM | Unregistration from the CRIM |
| hastate_assign | Callback | CRIM | Component | The CRIM commands the component to take a role and assignment |
| hastate_abort | Callback | CRIM | Component | The CRIM asks for the pending assignment command to be aborted |
| hastate_notify | Callback | CRIM | Component | The CRIM informs the component of changes within the current assignments |
| crim_hastate_completed | API | Component | CRIM | The component notifies the CRIM of the completion of the ongoing command. |
| crim_state_query | API | Component/ systems | CRIM | Retrieves a specified state of a component |
| crim_hastate_claim | API | Component | CRIM | The component claims a role and assignment |

Figure 5:
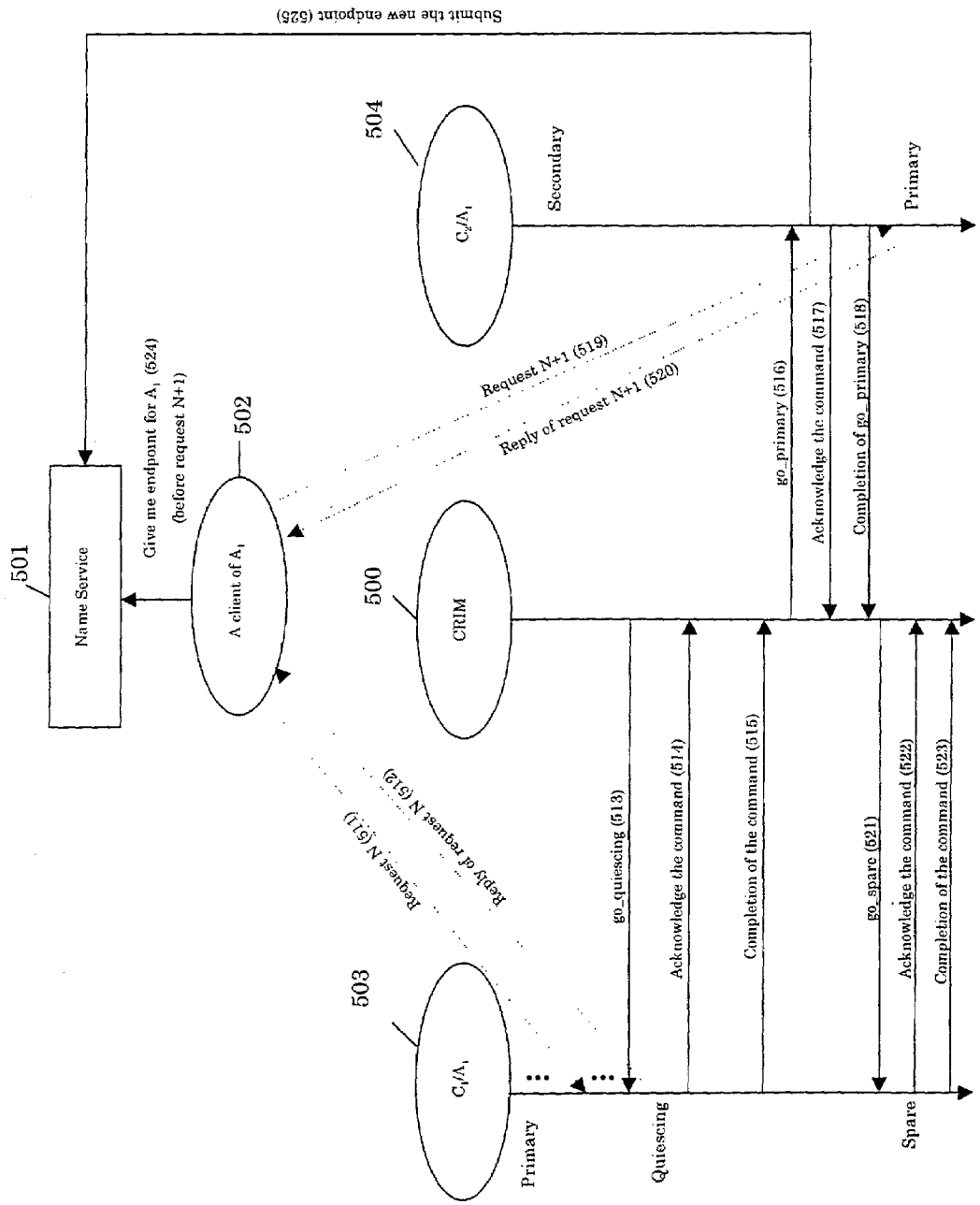
FIG. 5 is a block diagram showing one scenario for using a quiescing state.

FIG. 5 is a block diagram depicting a scenario illustrating one exemplary use of a quiescing state. In the scenario shown in FIG. 5, a CRIM 500 has initially allocated an assignment $A_1$ to components $C_1$ 503 and $C_2$ 504, giving a primary role to the component $C_1$ 503 and a secondary role to the component $C_2$ 504. A client of $A_1$ 502 issues a request N 511 before the CRIM 500 sends a go_quiescing command 513 to the component $C_1$ 503.

Once the CRIM 500 issues the $go_{13}$ quiescing command 513 to the component $C_1$ 503, the component $C_1$ 503 acknowledges the command 514, sets a timeout for a completion of the ongoing activities, and enters the quiescing state. During the quiescing state, the component $C_1$ 503 is still the primary provider of the service—the component $C_1$ 503 attempts to process clients' requests that have been submitted before the go_quiescing command 513 is issued. In this case, the component $C_1$ 503 sends a reply of request N 512 to the client of $A_1$ 502. As to client requests issued while in the quiescing state, the component $C_1$ 503 receives them and stops processing them. To allow a smooth transition from the component $C_1$ 503 to the component $C_2$ 504, the component $C_1$ 503 may flush its checkpoint and close it before sending the go_quiescing completion notification 515 to the CRIM 500.

When the CRIM 500 receives the completion of go_quiescing 515 from the component $C_1$ 503, it requests the component $C_2$ 504, which is the associated secondary component, to go primary by issuing a go_primary command 516. The component $C_2$ 504 acknowledges the command 517 and notifies the completion of go_primary 518 to the CRIM 500. After becoming primary, the component $C_2$ 504 inserts its service endpoint 525 in the name service 501, thus becoming ready to serve the client of $A_1$ 502, which has asked for an endpoint for $A_1$ from the name service 501 before issuing a request N+1 519.

When the CRIM 500 receives the completion notice 518 from the component $C_2$ 504 for the go_primary command 516, it sends a go_spare request 521 to the component $C_1$ 503. The component $C_1$ 503 acknowledges the command 522. Upon receiving the $go_{13}$ spare command 503, the component $C_1$ 503 rejects all queued requests from the client of $A_1$ 502. The client of $A_1$ 502 gets a new endpoint from the name service 501 and reissues the rejected requests to the new primary component $C_2$ 504. After receiving the new endpoint in response to a request for an endpoint 524, the client of $A_1$ 502 issues the request N+1 519 to the component $C_2$ 504, which in turn sends a reply of the request N+1 520 to the client of $A_1$ 502. As to $C_1$ 503, it notifies the completion of the go_spare command 523 to the CRIM 500.

Figure 6:
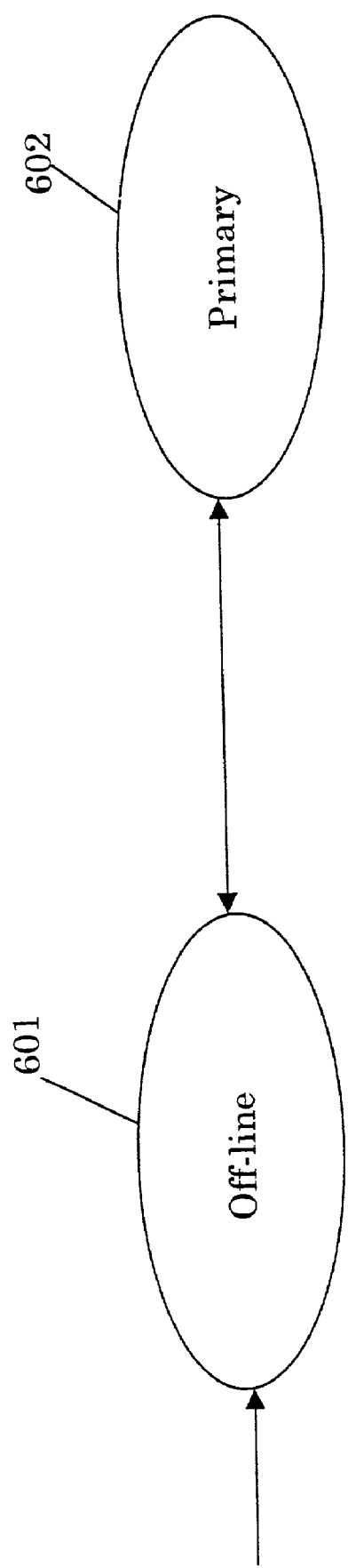
FIG. 6 is a block diagram showing relationships between two availability states of a non-high-availability-managed component.

Turning to FIG. 6, some components are not intended to be managed for high availability by a CRIM. Such components are referred to as non-HA-managed (or "non-HA") components. Non-HA-managed components may not have a full availability state because they do not represent a replicated service. In one preferred embodiment of the present invention, non-HA-managed components may register with the CRIM in order to be managed by an external management.

For the uniformity purpose and for ease of the CRIM implementation, non-HA components may also have their own availability states. However, non-HA components may not be able to have all five availability states devised for HA-components. Non-HA components may accept one of the following availability states: a off-line state 601 and a primary state 602. A non-HA component is in the off-line state 601, when it does not provide its specified service. A non-HA component is in the off-line state if it is locked or disabled. When a non-HA component provides its specified functionality, it is said to be in the primary state 602. The CRIM either allows or disallows non-HA-components to provide services.

Next, various recovery procedures performed by the CRIM to maintain high-availability are explained.

The CRIM manages availability aspects of components and orchestrates recovery procedures upon detection of errors. The CRIM may be programmed to receive information about possible errors and recommend recovery actions received from an external source. The CRIM may also be programmed to consider the current cluster configuration and recovery policies in devising recovery procedures.

One example of recovery procedures involves switching a secondary component to a primary role in order to replace a failing or failed primary component. Indeed, there are at least two different scenarios during which a secondary component may switch to the primary role. Two scenarios are called fail-over and switch-over. Fail-over occurs, when a current primary component has failed. In this case, a secondary component takes over the primary role without expecting any cooperation or coordination from its primary partner. Switch-over occurs, when the primary partner is healthy, but it expects to lose its primary role as a part of a wider recovery and/or administrative action. For example, the CRIM may simply prefer to switch a secondary component into a primary role, although the current primary component is healthy. During switch-over, the current primary component can help the secondary component—for example, it may explicitly close checkpoints and flush its caches for shared files.

The same concept may be used at a node level as well. Specifically, when a node fails, the CRIM may orchestrate a node fail-over during which the secondary partners of all primary components of the failed node become primary through fail-over. Also, a node can be switched over, for example, when the node is locked, by switching over all primary components of the locked node.

When an external management agent requests an administrative action on a specific component, the CRIM may put the corresponding component (and probably the relevant components) in the off-line state. However, the component itself does not need to know the reasons for becoming off-line. The CRIM may maintain information about the administrative and operational states of the component. Administrative operations that external management agents may issue include lock, unlock, and shutdown. Moreover, to perform necessary diagnoses and repair actions, the CRIM may be requested to enable, disable, or terminate a component.

The CRIM may also participate in a recovery phase that involves system services. For some escalated recovery actions for a specific failure scenario involving centralized system services, the CRIM may first orchestrate the application component's recovery (if possible or necessary), then initiate the system services recovery by requesting relevant system services to carry out the system-service level actions such as a node switch-over or fail-over.

Recovery actions for some failures may be to terminate and possibly to restart a component. To support this, the CRIM may issue a command necessary to begin operations for terminating and restarting a component.

The CRIM may be programmed to handle a software upgrade mechanism by using a concept called software release domain ("SRD"). Each node in a cluster may be a member of one SRD. A cluster may be made up of one or more SRDs when the cluster is in the process of a software upgrade. Thus, in order to support software upgrade, the CRIM may need to keep information about the SRDs for various components and be aware of discrepancies between the SRDs of the components implementing an assignment.

During a rolling software upgrade process, there may be times when primary and secondary components of an assignment belong to different software release domains—that is, the primary and secondary components may run different versions of software. Components implementing an assignment need to know about a possible intra-assignment version discrepancy to co-exist. For example, when a software upgrade is in progress and the primary component is in a higher version than its secondary counterpart, it may be beneficial to make the primary component aware of the situation.

The CRIM may maintain information about SRDs and warn components that a software upgrade is in progress. In other words, the CRIM may warn a component that its SRD may be different from those of its partners so that it may take actions to work with its partners. For example, components with newer versions may be required to take actions to work with their older-version partners.

Figure 10A:
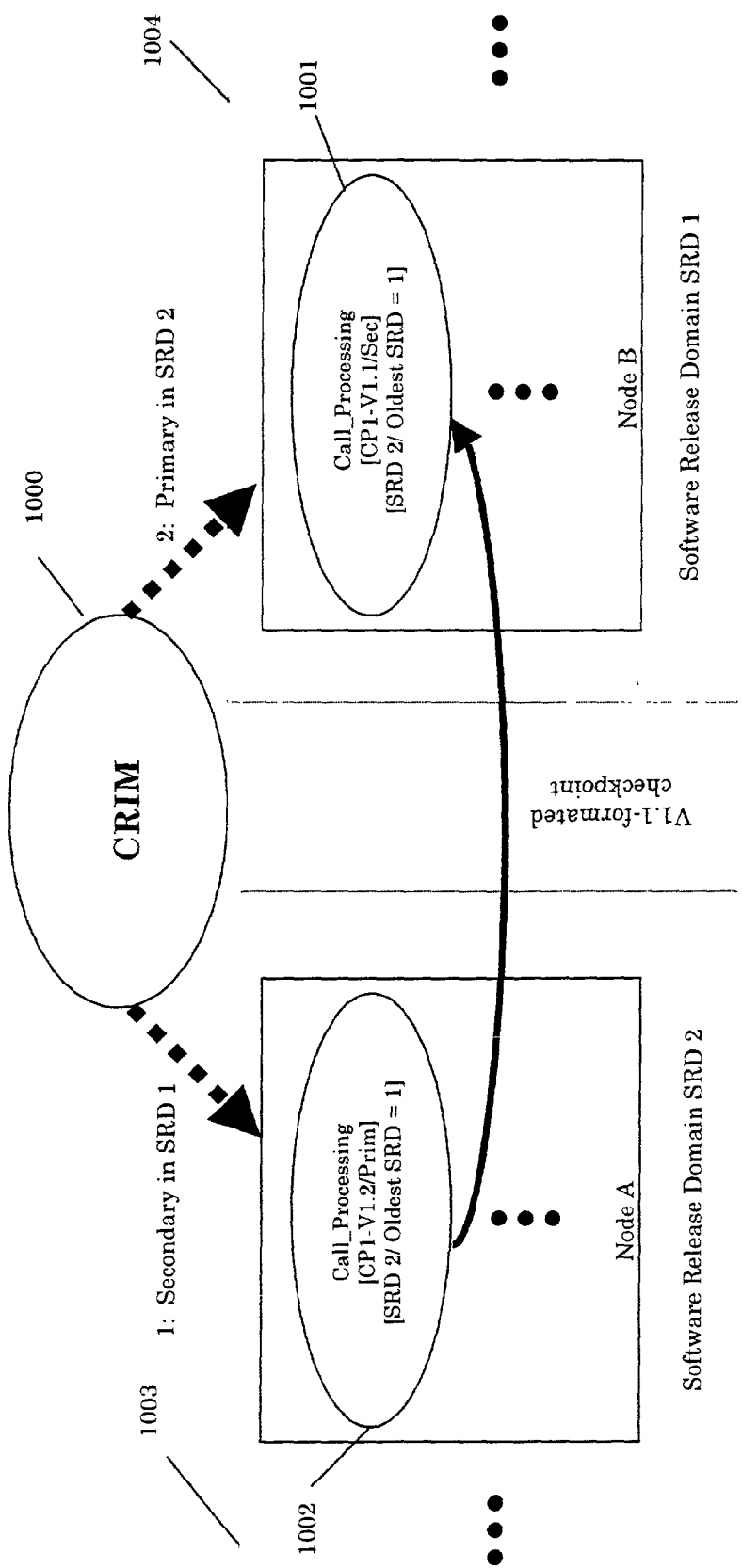
FIGS. 10A and 10B are block diagrams illustrating one example of using software release domains.
Figure 10B:
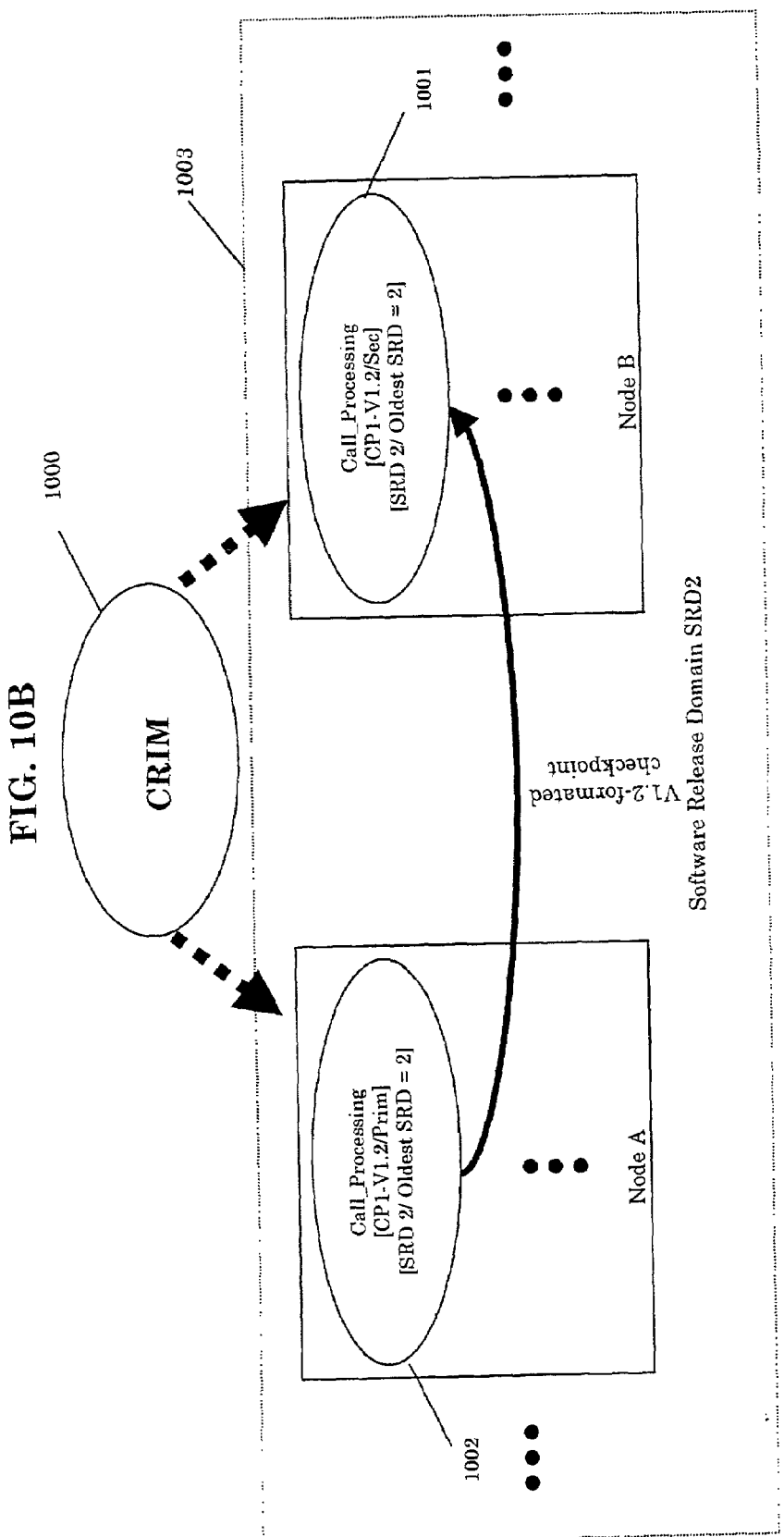

FIGS. 10A and 10B illustrate how a CRIM 1000 may be used to support software upgrade. Referring to FIG. 10A, a primary component 1002 with the $CP_1$ assignment of the call processing component type is in a SRD_2 1003 running an application/API version $V_{1.2}$, while its secondary component 1001 is located in a SRD_1 1004 running an application/API version $V_{1.1}$. In this scenario, the CRIM 1000 notifies the primary component 1002 of the situation. Then the primary component 1002 may find out about the application/API version of its secondary partner and adjust its coordination accordingly. In this example, the primary component 1002 may use a $V_{1.1}$-formatted checkpoint.

In FIG. 10B, the node B is rebooted and now belongs to the SRD_2 1003, which means that the secondary component 1002 is now using $V_{1.2}$. The CRIM 1000 may recognize that the primary component and its secondary partner are running in the same software release domain and notify the primary component 1002 of the fact. The primary component 1002 may readjust its functions to accommodate this change in the node B's software release domain. In other words, the primary component 1002 may use a $V_{1.2}$-formatted checkpoint.

The CRIM may also manage component relationships. Further, the CRIM may provide component relationships to other processes or management agents. For example, the CRIM may provide an API for retrieving and browsing relationship information on various entities such as components and assignments. System services such as management agents may use this API to investigate relationships between components.

There may be at least two types of relationships managed by the CRIM—constellation relationship (or co-location relationship) and containment relationship. While these two types of relationships are related, they have some differences as discussed in detail below.

The constellation relationship may arise among components that require frequent communication and coordination among them. Specifically, the constellation relationship may be found in cases in which multiple assignments of the same or different component types have frequent communication or coordination patterns. The close inter-assignment interaction may make it impossible or inefficient to run components implementing these assignments in different nodes for many reasons, including a potential overhead of a cluster-wide communication. Thus, it may be desirable to co-locate such assignments by forming an assignment constellation.

The CRIM may be programmed to guarantee that the primary members of a constellation are located in the same node, if possible. This means, among other things, that a fail-over of a component representing a member of the constellation may cause a switch-over of the other members of the constellation.

The concept of constellation may be viewed as co-locating components implementing tightly coupled assignments. A component may or may not participate in a constellation depending on its current assignment and role. More precisely, a constellation of assignments means that: (1) the primary components of these assignments are co-located in the same node, if possible and (2) the secondary components of these assignments are also co-located in the same node, if possible.

The constellation relationship may be represented as an ordered set of assignments. The order in the set may be used to specify the order in which the components implementing the member assignments are brought into service. For example, if {D1, G1} is a constellation, during initialization, fail-over, and switch-over, the component implementing the D1 assignment may be ordered to become primary first. Then; the component implementing the G1 assignment may be brought into service.

More generally, the constellation relationship may impose the following constraints on the CRIM. First, when the CRIM attempts to assign an initial role to a component C1 implementing a member A1 of a constellation, the CRIM is to postpone the role assignment to the component C1 until the initial roles of all components implementing the preceding members (or members with higher order than the member A1 in the constellation) have been assigned. Second, when the CRIM needs to switch over the members of a constellation, it needs to first make all associated primary components off-line, and then switch the secondary components to primary. Thus, the switch-over and initialization of a constellation are quite different from the switch-over and initialization of a set of independent components.

The CRIM may also be programmed to keep track and use other types of relationships among different entities as discussed in detail below.

Relationships managed by the CRIM may include assignment-level, component-level, and assignment-to-component relationships.

Assignment-level Relationships: Assignment-level relationships may include an assignment-level functional dependency and an assignment constellation. An assignment-level functional dependency exists between assignments A and B, if the assignment A functionally depends on the assignment B. In other words, a primary component implementing the assignment A depends on a primary component implementing the assignment B in order to function.

The CRIM may use assignment-level functional dependency relationships to determine the order of giving assignments to components. For example, if the assignment A depends on the assignment B, the CRIM may allocate components for the assignment B before allocating components for the assignment A.

The CRIM may also use assignment-level functional dependency relationships to make more effective management decisions. For example, if the assignment A depends on the assignment B, and if no component for the assignment B is available, the CRIM may decide that there is no need to allocate a component for the assignment A.

Finally, as discussed earlier, assignment constellations define co-location relationships among multiple assignments. The CRIM may use them to guarantee that primary and/or secondary components of member assignments are located on the same node, if possible.

Component-level Relationships: The component level is another level that may capture several relationships including a physical containment relationship and a component-level compulsory functional dependency.

A physical containment relationship may be used to capture containment relationships among components. Such components are typically hardware. The CRIM may use a physical containment relationship for executing management commands affecting administrative/operational states of a given component or for replying to queries issued by an external management on various states of given components.

In a component-level compulsory functional dependency, a component (not necessarily its given assignment) depends on another component. For example, a board may depend on a specific connection. This relationship is more applicable to hardware/software components that interact with the environment. The CRIM may use this relationship for propagating changes in administrative and/or operational states. For example, if a component A depends on a component B, then when the component B is asked to be locked, then the component A may be disabled.

Assignment-to-component Relationships: Assignment-to-component relationships may include an assignment relationship, a component-to-assignment dependency, and a proxied-by relationship.

First, the assignment relationship exists, when one or more components are allocated to an assignment. In other words, the assignment relationship represents cases in which the assignment has an "instantiation" relationship with the allocated components. The CRIM may use the assignment relationship to keep track of an availability status of a high availability assignment and for answering queries about current states of assignments, including those issued by an external management.

Second, when a component depends on an assignment or a protection group, there may be a component-to-assignment dependency. For example, when a component A depends on a protection group PG1, the disabling or locking members of the protection group PG1 may disable the component A. This relationship may be used for propagating operational states to the dependents of a protection group.

Third, the proxied-by relationship exists, when a component outside of the cluster is proxied by a service. Such component may be hardware or software, including a payload card and software running on it, for example. The CRIM may use it to associate between proxy and proxied components.

It will be apparent to those skilled in the art that various modifications and variations can be made in the present invention without departing from the spirit or scope of the invention. Thus, it is intended that the present invention covers the modifications and variations of this invention provided that they come within the scope of any claims and their equivalents.

What is claimed is:

1. A method of allocating an assignment to a plurality of high-availability-aware applications in a networked computer system, the method comprising;
   registering the plurality of high-availability-aware applications through an application programming interface;
   allocating roles to registered applications of the plurality of high-availability-aware applications by invoking a callback interface of the registered applications;
   maintaining application relationship information;
   selecting a first application from the registered applications based on application type information and the application relationship information;
   allocating the assignment to the first application by invoking a callback interface of the first application;
   changing a role of the first application to primary by invoking a callback interface of the first application;
   determining a redundancy level based on the application type information;
   selecting a predetermined number of secondary applications from the registered applications based on application type information of the secondary applications and the application relationship information, wherein the predetermined number is based on the determined redundancy level;
   changing roles of the predetermined number of secondary applications to secondary by invoking a callback interface of the secondary applications; and
   notifying the first application, by invoking a callback interface of the first application, about the predetermined number of secondary applications and the predetermined number of secondary applications, by invoking a callback interface of the secondary applications, about the first application.

2. The method of claim 1, further comprising:
   detecting an error affecting the first application;
   selecting a new primary application from the predetermined number of secondary applications using the application relationship information; and
   changing a role of the new primary application to primary by invoking a callback interface of the new primary application.

3. The method of claim 2, further comprising:
   instructing the first application to communicate information to the new primary application by invoking a callback interface of the first application.

4. The method of claim 1, further comprising:
   maintaining software release domain information, wherein the software release domain information is included in the notifying step.

5. The method of claim 1, further comprising:
   performing administrating actions on the registered applications in response to a request from an external management agent.

6. A computer program product stored on a tangible computer readable medium for allocating an assignment in a networked computer system, the computer program product comprising
   computer readable program code configured to provide an application programming interface to register a plurality of high-availability-aware applications components;
   computer readable program code configured to allocate roles to registered applications components of the plurality of high-availability-aware applications by invoking a callback interface of the registered applications;
   computer readable program code configured to allocate the assignment to a first application selected from the registered applications based on application type information of the first application by invoking a callback interface of the first application;
   computer readable program code configured to change a role of the first application to primary by invoking a callback interface of the first application;
   computer readable program code configured to determine a redundancy level based on the application type information;
   computer readable program code configured to allocate the assignment to a predetermined number of secondary applications selected from the registered applications based on application type information of the secondary components, wherein the predetermined number is based on the redundancy level by invoking a callback interface of the secondary applications;
   computer readable program code configured to change roles of the predetermined number of secondary applications to secondary by invoking a callback interface of the second applications;
   computer readable program code configured to notify the first application by invoking a callback interface of the first application about the predetermined number of secondary applications and the predetermined number of secondary applications about the first application by invoking a callback interface of the secondary applications; and
   a computer readable medium having the computer readable program codes embodied therein.

7. The computer program product of claim 6, further comprising:
  computer readable program code configured to detect an error affecting the first application;
  computer readable program code configured to select a new primary application from the predetermined number of secondary applications; and
  computer readable program code configured to change a role of the new primary application to primary by invoking a callback interface of the new primary application.

8. A system for allocating an assignment in a networked computer system, the system comprising:
  means for registering a plurality of high-availability-aware applications through an application programming interface;
  means for allocating roles to registered applications of the plurality of high-availability-aware applications by invoking a callback interface of the registered applications;
  means for allocating the assignment to a first application selected from the registered applications based on application type information of the first application by invoking a callback interface of the first application;
  means for changing a role of the first application to primary by invoking a callback interface of the first application;
  means for determining a redundancy level based on the application type information;
  means for allocating the assignment to a predetermined number of secondary applications selected from the registered applications based on application type information of the secondary applications, wherein the predetermined number is based on the redundancy level by invoking a callback interface of the secondary applications;
  means for changing roles of the predetermined number of secondary applications to secondary by invoking a callback interface of the secondary applications; and
  means for notifying the first application about the predetermined number of secondary applications by invoking a callback interface of the first application and the predetermined number of secondary applications components about the first application by invoking a callback interface of the secondary applications.

9. A mechanism configured to manage a plurality of high-availability-aware applications in a networked computer system, the mechanism comprising:
  a mechanism configured to register through an application programming interface the plurality of high-availability-aware applications to be managed; and
  a mechanism configured to dynamically allocate roles and assignments to registered applications of the plurality of high-availability-aware applications to achieve a desired redundancy level based on application type information by invoking a callback interface of the registered applications.

10. The mechanism of claim 9, further comprising:
  a mechanism configured to respond to an error by changing roles and assignments of the registered applications by invoking a callback interface of the registered applications.

11. The mechanism of claim 9, further comprising:
  a mechanism configured to provide information to the registered applications so that related applications among the registered applications may communicate to achieve the desired redundancy level.

12. The mechanism of claim 9, further comprising:
  a mechanism configured to perform administrative actions on the registered applications in response to a request from an external management agent.

13. The mechanism of claim 9, further comprising:
  a mechanism configured to maintain additional information relevant to managing the registered applications.

14. The mechanism of claim 13, wherein the additional information includes information regarding software release domains, application relationships, and protection groups.

* * * * *